(12) United States Patent
Louderback

(10) Patent No.: US 9,172,462 B2
(45) Date of Patent: Oct. 27, 2015

(54) OPTICAL BENCH APPARATUS HAVING INTEGRATED MONITOR PHOTODETECTORS AND METHOD FOR MONITORING OPTICAL POWER USING SAME

(71) Applicant: Zephyr Photonics Inc., Zephyr Cove, NV (US)

(72) Inventor: Duane Louderback, Zephyr Cove, NV (US)

(73) Assignee: Zephyr Photonics Inc., Zephyr Cove, NV (US)

( * ) Notice: Subject to any disclaimer, the term of this patent is extended or adjusted under 35 U.S.C. 154(b) by 43 days.

(21) Appl. No.: 14/133,154

(22) Filed: Dec. 18, 2013

(65) Prior Publication Data

US 2014/0186032 A1 Jul. 3, 2014

Related U.S. Application Data

(60) Provisional application No. 61/747,415, filed on Dec. 31, 2012.

(51) Int. Cl.
*H04B 10/00* (2013.01)
*H04B 10/079* (2013.01)
(Continued)

(52) U.S. Cl.
CPC ...... *H04B 10/07955* (2013.01); *H04B 10/0799* (2013.01); *H04B 10/40* (2013.01); *H04B 10/5057* (2013.01)

(58) Field of Classification Search
CPC ............ H04B 10/07955; H04B 10/40; H04B 10/5057; H04B 10/0799
USPC ........................................................ 398/38
See application file for complete search history.

(56) References Cited

U.S. PATENT DOCUMENTS

| 4,767,168 A | 8/1988 | Grandy |
| 4,811,361 A | 3/1989 | Bacou et al. |
| 4,895,426 A | 1/1990 | Pinson |

(Continued)

OTHER PUBLICATIONS

Dutton, Harry J.R., "Understanding Optical Communications," IBM, International Technical Support Organization, Retrieved from http://www.redbooks.ibm.corn, 638 pages.

(Continued)

*Primary Examiner* — Danny Leung
(74) *Attorney, Agent, or Firm* — Perkins Coie LLP

(57) ABSTRACT

Optical bench structure provides a platform for integrating optical transmitters, particularly Vertical-Cavity Surface-Emitting Lasers (VCSELs), with monitor photodetectors. A substrate with photodetectors on the front side is aligned with flip-chip bonding bumps so the emission of the transmitters is aligned with the monitor photodetectors and passes through the monitor photodetectors with a portion of the transmitted light absorbed by the monitor photodetectors. The photodetectors have a thin absorption region so the percentage of light absorbed may be relatively small, providing sufficient photocurrent to monitor the transmitted power having a minimal effect on the transmitted power. Microlenses are integrated on the backside of the substrate focus, steer and/or collimate the emitted optical beams from the transmitters. The structure enables photodetectors to be integrated on the optical bench allowing the received optical power to be monitored. The receiver photodetectors are integrated on the optical bench alone and/or in combination with the transmitters.

37 Claims, 3 Drawing Sheets

(51) Int. Cl.
*H04B 10/40* (2013.01)
*H04B 10/50* (2013.01)

(56) References Cited

U.S. PATENT DOCUMENTS

| | | | |
|---|---|---|---|
| 4,930,049 A | 5/1990 | Davenport et al. | |
| 5,212,750 A | 5/1993 | Wright | |
| 5,757,836 A | 5/1998 | Jiang et al. | |
| 5,844,236 A | 12/1998 | Wilson | |
| 5,974,071 A * | 10/1999 | Jiang et al. | 372/50.21 |
| 6,052,248 A | 4/2000 | Reed et al. | |
| 6,052,632 A | 4/2000 | Iihoshi et al. | |
| 6,222,976 B1 | 4/2001 | Shahid | |
| 6,351,590 B1 | 2/2002 | Shahid | |
| 6,408,014 B1 * | 6/2002 | Ackerman et al. | 372/32 |
| 6,519,395 B1 | 2/2003 | Bevan et al. | |
| 6,631,490 B2 | 10/2003 | Shimoda | |
| 6,694,083 B2 | 2/2004 | Paradiso et al. | |
| 6,795,947 B1 | 9/2004 | Siegel et al. | |
| 6,978,319 B1 | 12/2005 | Rostoker et al. | |
| 6,989,776 B2 | 1/2006 | Tsang | |
| 7,000,177 B1 | 2/2006 | Wu et al. | |
| 7,030,789 B1 | 4/2006 | Cideciyan et al. | |
| 7,044,656 B1 | 5/2006 | Hofmeister et al. | |
| 7,071,851 B1 | 7/2006 | Blaum et al. | |
| 7,103,830 B1 | 9/2006 | Dong | |
| 7,120,778 B2 | 10/2006 | Zimmer | |
| 7,174,485 B2 | 2/2007 | Silvus | |
| 7,290,184 B2 | 10/2007 | Bruner et al. | |
| 7,307,556 B2 | 12/2007 | Lee | |
| 7,362,936 B2 | 4/2008 | Stark et al. | |
| 7,409,622 B1 | 8/2008 | Lu et al. | |
| 7,515,797 B2 | 4/2009 | Stark et al. | |
| 7,515,798 B2 | 4/2009 | Stark et al. | |
| 7,714,748 B1 | 5/2010 | Chaichanavong | |
| 7,962,827 B2 | 6/2011 | Tang et al. | |
| 8,049,648 B2 | 11/2011 | Chaichanavong | |
| 8,055,977 B2 | 11/2011 | Ito | |
| 8,069,391 B1 | 11/2011 | Wu et al. | |
| 8,151,162 B2 | 4/2012 | Kanaoka et al. | |
| 8,161,347 B1 | 4/2012 | Kou | |
| 8,225,148 B2 | 7/2012 | Tang et al. | |
| 8,904,258 B2 | 12/2014 | Stark | |
| 9,020,344 B2 | 4/2015 | Stark | |
| 2001/0012767 A1 | 8/2001 | Kim | |
| 2001/0017376 A1 | 8/2001 | Verdiell | |
| 2002/0114591 A1 * | 8/2002 | Brezina et al. | 385/89 |
| 2004/0175077 A1 | 9/2004 | Weber | |
| 2005/0259571 A1 | 11/2005 | Battou | |
| 2006/0051103 A1 * | 3/2006 | Ranganath | 398/183 |
| 2006/0126069 A1 | 6/2006 | Cho et al. | |
| 2006/0140564 A1 | 6/2006 | Upton | |
| 2006/0159462 A1 | 7/2006 | Aronson et al. | |
| 2006/0230425 A1 | 10/2006 | Shani et al. | |
| 2009/0060529 A1 * | 3/2009 | Beranek | 398/197 |
| 2010/0061726 A1 | 3/2010 | Barbarossa et al. | |
| 2013/0056620 A1 | 3/2013 | Perraut et al. | |
| 2013/0308900 A1 | 11/2013 | Doany et al. | |

OTHER PUBLICATIONS

Papadimitriou, G.I., et al., "Optical Switching: Switch Fabrics, Techniques, and Architectures," Journal of Lightwave Technology, 21(2), 384-405, Feb. 2003.

Popplewell et al., "Peformance Aspects of Error Correcting Line Codes," Second IEEE National Conference on Telecommunications, pp. 47-52, 1989.

Small, B.A., et al., "The Current and Future State of Optical Switching Technologies as Related to the Data Vortex Photonic Switching Architecture," 6 pages.

Strzelecka, E. M., et al.,"Parallel Free-Space Optical Interconnects Based on Arrays of Vertical-Cavity Lasers and Detectors with Monolithic Microlenses," Applied Optics, 37(14):2811-2821,1998.

Yang, Q. et al., "New Switch Fabric Architecture for Bursty Traffic," IEEE, 43-44, 2002.

\* cited by examiner

OPTICAL BENCH APPARATUS HAVING INTEGRATED MONITOR PHOTODETECTORS AND METHOD FOR MONITORING OPTICAL POWER USING SAME

CROSS REFERENCE TO RELATED APPLICATIONS

This application claims the benefit of U.S. Provisional Application Ser. No. 61/747,415 entitled "Optical Bench Apparatus and Method" filed Dec. 31, 2012 which is hereby incorporated herein by reference in its entirety.

BACKGROUND OF THE INVENTION

This invention relates generally to optical power monitoring. In particular, the invention relates specifically to an optical bench apparatus having integrated monitor photodetectors and a method for monitoring optical power using the optical bench apparatus for optical power monitoring in optical modules. Monitoring the level of optical power emitted by transmitters may be a highly desirable feature in many optical modules, especially optical transceivers. Monitoring the optical power may allow the bias and/or modulation currents to be optimized to achieve the desired operating characteristics of both the transmitter itself, as well as the entire optical link. Such optimization of the bias and/or modulation currents may allow operating characteristics to be adjusted for temperature variations and/or degradation due to aging, optical alignment and/or other environmental factors. Monitoring the transmitted power and/or received power in an optical link may enable health monitoring and/or functions to be implemented in the transceiver. Further, monitoring the transmitted power and/or received power in an optical link may also enable built-in test functions to be implemented in the transceiver.

Optical power monitoring of transmitters has been implemented by various methods. One such method of optical power monitoring may create a back-reflection in the optical package and utilize this back-reflection to monitor the optical power. For example, U.S. Pat. No. 5,757,836 discloses TO-can-based transmitter optical subassemblies (TOSAs) that may implement such a method of optical power monitoring. A cap on the TO-can may provide a small back-reflection that may then be detected by a monitor photodetector placed either next to the transmitting devices and/or underneath the transmitting devices such that the cap of the TO-can may extend laterally beyond the extent of the transmitter die. The TO-can-based method has been acceptably implemented but may be best-suited to modules with a small number of transmitters. Further, the method may not scale well to parallel modules with a small form factor.

Another method and/or approach to optical power monitoring may utilize back-side emission of a transmitting device. Although such a method may be possible with a Vertical-Cavity Surface-Emitting Laser (VCSEL), implementation with an in-plane laser in which emission from the back facet may be exploited to monitor the power emission from the laser may be more feasible and/or effective. An example of this method and/or approach may be implemented with a 622 Mb/s Logic Interface DFB Laser Transmitter manufactured by Hewlett Packard. The technical specifications and other information for such a device may be found on the Internet in http://www.datasheetcatalog.org/datasheet/hp/XMT5170B-622-AP.pdf. This method and/or approach to optical power monitoring may be implemented in many different ways. For example, such a method of optical power monitoring may be monolithically integrated and/or heterogeneously integrated. A fundamental approach in such methods and/or approaches may use a transmission out of the back facet. The power of the back facet transmission may be a known ratio of the power out of the front facet. The front facet power may be used for the transmitter in the optical module, while the back facet power may be absorbed by a monitor photodetector to provide the power monitoring.

Various substrates have also been utilized as optical benches for integrating transmitters and/or photodetectors. Some of these optical benches have included backside microlenses formed by a variety of techniques. For example, such microlenses are disclosed in "Parallel Free-Space Optical Interconnects Based on Arrays of Vertical-Cavity Lasers and Detectors with Monolithic Microlenses," Eva M. Strzelecka, et al., volume 37, issue 14, pp. 2811-2821, 1998.

SUMMARY OF THE INVENTION

In an embodiment of the present invention, an optical bench apparatus is provided. The optical bench apparatus may have a transparent substrate with electrical interconnect lines and/or pads for attaching transmitters and/or receivers by flip-chip bonding. Monitor photodetectors may be aligned to these bonding sites. The monitor photodetectors may be designed to absorb a small fraction of the transmitted and/or received light and convert that fraction of light into a monitor photocurrent for optimizing bias and/or modulation currents to achieve desired operating characteristics of the transmitter and/or an optical link. Such optimization of the bias and/or modulation currents may allow operating characteristics to be adjusted for temperature variations and/or degradation due to aging, optical alignment and/or other environmental factors. Monitoring the transmitted power and/or received power in an optical link may enable health monitoring and/or functions to be implemented in the transceiver. Further, monitoring the transmitted power and/or received power in an optical link may also enable built-in test functions to be implemented in the transceiver.

In another embodiment, a populated optical bench with back-side microlenses for either focusing and/or collimating output/input optical beams is provided. The optical bench apparatus may have a transparent substrate with electrical interconnect lines and/or pads for attaching transmitters and/or receivers by flip-chip bonding. Monitor photodetectors may be aligned to these bonding sites. The monitor photodetectors may be designed to absorb a small fraction of the transmitted and/or received light and convert that fraction of light into a monitor photocurrent for optimizing bias and/or modulation currents to achieve desired operating characteristics of the transmitter and/or an optical link. Such optimization of the bias and/or modulation currents may allow operating characteristics to be adjusted for temperature variations and/or degradation due to aging, optical alignment and/or other environmental factors. Monitoring the transmitted power and/or received power in an optical link may enable health monitoring and/or functions to be implemented in the transceiver. Further, monitoring the transmitted power and/or received power in an optical link may also enable built-in test functions to be implemented in the transceiver.

To this end, an optical bench apparatus is provided. The optical bench apparatus may have a substrate with a first side and a second side. The second side may be located opposite the first side. An optical power monitor photodetector may be integrated on the first side of the substrate. A light transmitter may have an optical output, and first electrical interconnect lines located on the substrate may permit integrating the light transmitter on the substrate. Second electrical interconnect lines located on the substrate may be connected to the optical power monitor photodetector. The light transmitter may be arranged relative to the optical power monitor photodetector such that the optical output of the light transmitter impinges on the optical power monitor photodetector. The substrate may be transparent to the optical output of the light transmitter.

In an embodiment, the light transmitter may be a light emitting diode (LED), a vertical-cavity surface-emitting laser (VCSEL), a Fabry-Perot laser having an angled mirror for vertical emission, a distributed feedback (DFB) laser having an angled mirror for vertical emission or a DFB laser having a diffraction grating for vertical emission.

In an embodiment, the light transmitter may be integrated by flip-chip bonding.

In an embodiment, the light transmitter may be integrated by die placement.

In an embodiment, the light transmitter may be aligned to allow substantial overlap of the optical output emitted power with the optical power monitor photodetector.

In an embodiment, the substrate may be transparent to the light emitted by the light transmitter.

In an embodiment, the substrate may have one or more lenses formed on the side opposite the light transmitter.

In an embodiment, the lenses may be refractive lenses or diffractive lenses.

In an embodiment, the lenses may collimate the output from the light transmitter.

In an embodiment, the lenses may focus the output from the light transmitter.

In an embodiment, the lenses may steer the output from the light transmitter.

In an embodiment, the substrate may have one or more surfaces anti-reflection coated.

In an embodiment, the electrical interconnect lines may be impedance matched.

In an embodiment, the light transmitter may emit light through the optical power monitor photodetector.

In an embodiment, the optical power monitor photodetector may absorb part of the power emitted by the light transmitter and part of the power may be emitted by the light transmitter may be transmitted through the substrate.

In an embodiment, the optical power monitor photodetector may absorb a portion of the power emitted by the light transmitter.

In an embodiment, the light transmitter may emit light vertically in a first direction away from the substrate and in a second direction into the substrate.

In an embodiment, the light transmitter may emit a first portion of the optical output power away from the substrate and may emit a second portion of the power into the substrate wherein the first portion may be greater than the second portion.

In an embodiment, the monitor photodetector may absorb a portion of the light emitted into the substrate.

In an embodiment, the substrate may be a semiconductor, Gallium Arsenide (GaAs), semi-insulating Gallium Arsenide (GaAs), Aluminum Gallium Arsenide (AlGaAs), Indium Phosphide (InP), silicon, an insulator, sapphire or quartz glass.

In an embodiment, the monitor photodetector may be epitaxially grown.

In an embodiment, the monitor photodetector may be a single crystal semiconductor.

In an embodiment, the monitor photodetector may be a p-i-n photodetector.

In an embodiment, the monitor photodetector may have one or more quantum wells as the absorbing region.

In an embodiment, the monitor photodetector may have one or more absorbing layers of quantum dots.

In an embodiment, the monitor photodetector may be a metal-semiconductor-metal (MSM) photodetector.

In an embodiment, the monitor photodetector may have an absorbing region of Indium Gallium Arsenide (InGaAs).

In an embodiment, the monitor photodetector may be deposited by chemical vapor deposition.

In an embodiment, the monitor photodetector may be a single crystal, polycrystalline, or amorphous material.

In an embodiment, the monitor photodetector may be silicon, germanium, or Indium Gallium Arsenide (InGaAs).

In an embodiment, one or more transmitters may be replaced by one or more receiver photo detectors.

In another embodiment of the invention an optical bench apparatus is provided. The optical bench apparatus may have a substrate having a first side and a second side. The second side may be located opposite the first side. An optical input may be incident on the second side of the substrate. An optical power monitor photodetector may be integrated on the first side of the substrate. The optical bench apparatus may have a photodetector. First electrical interconnect lines may be located on the substrate. The first electrical interconnect lines may permit integrating the photodetector on the substrate. Second electrical interconnect lines located on the substrate may be connected to the optical power monitor photodetector. The photodetector may be aligned with the optical power monitor photodetector such that a portion of the optical input to the photodetector passes through the optical power monitor photodetector. The substrate may be transparent to the optical input.

In an embodiment, the photodetector may be a p-i-n photodetector.

In an embodiment, the photodetector may be a resonant cavity photodetector, an avalanche photodetector or a MSM photodetector.

In an embodiment, the photodetector is integrated by flip-chip bonding.

In an embodiment, the photodetector may be integrated by die placement.

In an embodiment, the photodetector may be aligned to allow substantial overlap of the received optical power with the optical power monitor photodetector.

In an embodiment, the substrate may be transparent to the light received by the photodetector.

In an embodiment, the substrate may have one or more lenses and/or microlenses formed on a back side of the substrate opposite a front side of the substrate having the photodetector.

In an embodiment, the back side microlenses may be aligned to front side devices to form optical beams.

In an embodiment, the microlenses may be refractive and/or diffractive.

In an embodiment, the microlenses may focus and/or collimate the output beams of the transmitters to simplify coupling of the light into optical fibers and/or other optical components.

In an embodiment, the microlenses may focus the incoming beam onto the receiver.

In an embodiment, the microlenses may be designed to collimate the input to the photodetector.

In an embodiment, the microlenses may be designed to focus the input to the photodetector.

In an embodiment, the microlenses may be designed to steer the input to the photodetector.

In an embodiment, the electrical interconnect lines may be impedance matched.

In an embodiment, the photodetector may receive light through the optical power monitor photodetector.

In an embodiment, the optical power monitor photodetector may absorb part of the incoming power for the photodetector and part of the power for the photodetector may be received through the substrate.

In an embodiment, the optical power monitor photodetector may absorb a portion of the power for the photodetector.

In a further embodiment, a method of monitoring optical power is provided. The method may have the steps of providing an optical bench apparatus having a substrate with electrical interconnect lines; integrating an optical power monitor photodetector with the substrate wherein the electrical interconnect lines connect the optical power monitor photodetector; integrating a light transmitter with the substrate wherein the electrical interconnect lines connect the light transmitter and further wherein the light transmitter has an optical output; and aligning the optical output of the light transmitter relative to the optical power monitor photodetector such that the optical output of the light transmitter impinges on the optical power monitor photodetector.

In an embodiment, the method may have the step of optimizing bias and/or modulation currents to achieve desired operating characteristics of the transmitter.

In an embodiment, the method may have the step of optimizing bias and/or modulation currents to achieve desired operating characteristics of an optical link.

In an embodiment, the method may have the step of adjusting operating characteristics of the transmitter for temperature variations by optimizing bias and/or modulation currents.

In an embodiment, the method may have the step of adjusting operating characteristics of the transmitter for degradation by optimizing bias and/or modulation currents.

In an embodiment, the method may have the step of implementing health monitoring in a transceiver by monitoring the transmitted power and/or received power in an optical link.

In an embodiment, the method may have the step of implementing built-in test functions in a transceiver by monitoring the transmitted power and/or received power in an optical link.

In yet another embodiment, a method of monitoring optical power is provided. The method may have the step of providing an optical bench apparatus having a substrate and an integrated optical power monitor photodetector. The method may have the step of providing electrical interconnect lines on the substrate. The method also may have the steps of integrating a photodetector with the electrical interconnect lines to the optical bench apparatus and connecting the monitor photodetectors with the electrical interconnect lines to the optical bench apparatus. The method may have the step of aligning the input of the photodetector such that the input of the photodetector overlaps with the monitor photodetector.

An advantage of the invention may be to provide an optical bench apparatus in which a smaller, faster photodetector may be used.

Another advantage of the invention may be to provide an optical bench apparatus to improve alignment tolerances.

A further advantage of the invention may be to provide an optical bench apparatus having one or more lenses formed on the side opposite the light transmitter. The lenses may be refractive and/or diffractive. The lenses collimate the output from the light transmitter, focus the output from the light transmitter and/or steer the output from the light transmitter.

Another advantage of the invention may be to provide a method of monitoring optical power having the step of optimizing bias and/or modulation currents to achieve desired operating characteristics of the transmitter and/or an optical link.

Yet another advantage of the invention may be to provide a method having the step of adjusting operating characteristics of the transmitter for temperature variations and/or degradation by optimizing bias and/or modulation currents.

Still another advantage of the invention may be to provide a method having the step of implementing health monitoring and/or built-in test functions in a transceiver by monitoring the transmitted power and/or received power in an optical link.

DETAILED DESCRIPTION OF THE INVENTION

In an embodiment of the invention, an optical bench apparatus may have a transparent substrate with electrical interconnect lines and/or pads for attaching transmitters and/or receivers by flip-chip bonding. Aligned to these bonding sites may be monitor photodetectors that may be designed to absorb a small fraction of the transmitted and/or received light and convert it into a monitor photocurrent for optimizing bias and/or modulation currents to achieve desired operating characteristics of the transmitter and/or an optical link.

Figure 1:
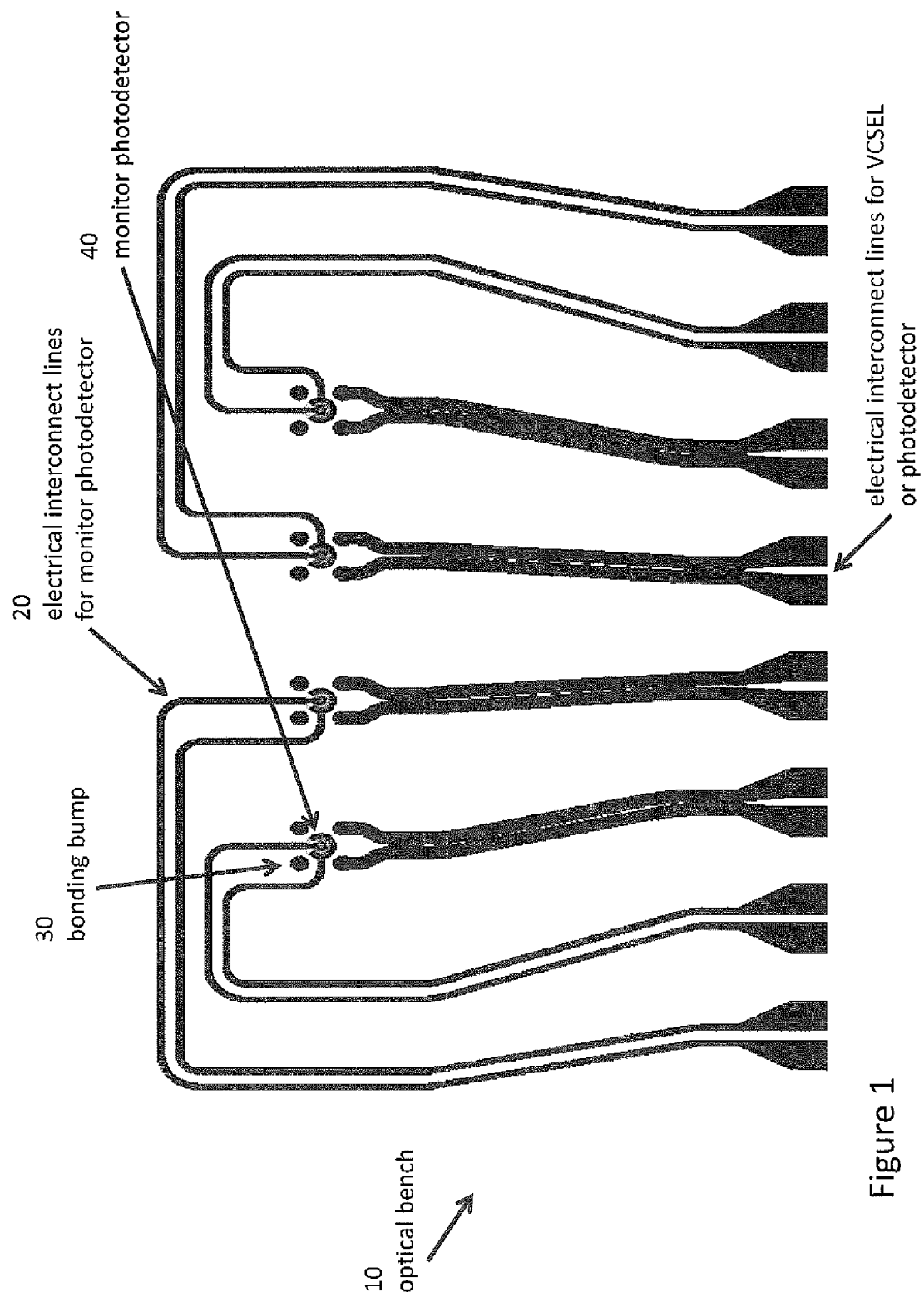
FIG. 1 is a schematic diagram of an embodiment of an optical bench having a transparent substrate with electrical interconnect lines and/or flip-chip bonding bumps aligned to monitor photodetectors.

Referring now to the Figures where like numerals indicate like elements, a schematic diagram of an embodiment of the optical bench apparatus is shown in FIG. 1. In particular, FIG. 1 schematically illustrates an optical bench apparatus 10 having a transparent substrate with electrical interconnect lines 20 for monitor photodetectors and/or bonding sites 30 for attaching transmitters (see FIGS. 2 and 3) and/or receivers (see FIGS. 2 and 3) by flip-chip bonding, for example. In an embodiment, the bonding sites 30 may be bonding bumps and/or pads. Monitor photodetectors 40 may be aligned to the bonding sites 30.

The monitor photodetectors 40 may be designed to absorb a small fraction of the transmitted light and/or the received light. Further, the monitor photodetectors 40 may be designed to convert the fraction of the light into a monitor photocurrent. The monitor photocurrent may be utilized for optimizing bias and/or modulation currents to achieve desired operating characteristics of the transmitter and/or an optical link. Such optimization of the bias and/or modulation currents may allow operating characteristics to be adjusted for temperature variations and/or degradation due to aging, optical alignment and/or other environmental factors. Monitoring the transmitted power and/or received power in an optical link may enable health monitoring and/or functions to be implemented in the transceiver. Further, monitoring the transmitted power and/or received power in an optical link may also enable built-in test functions to be implemented in the transceiver.

Further, the optical bench apparatus 10 may have the substrate 100 with the monitor photodetectors 40 on the front side. The monitor photodetectors 40 may be aligned with the flip-chip bonding bumps 30 such that the light emission of the transmitters, the VCSELs 50 and/or the Light Emitting Diodes (LEDs), 60, after flip-chip bonding, may be aligned with the monitor photodetectors 40. Thus, the light emission of the transmitters may pass through the monitor photodetectors 40 with a portion of the transmitted light absorbed by the monitor photodetectors 40. The monitor photodetectors 40 may have a thin absorption region, preferably quantum wells, such that the percentage of light absorbed may be relatively small, providing sufficient photocurrent to monitor the transmitted power, but small enough to have a minimal effect of the transmitted power.

Figure 2:
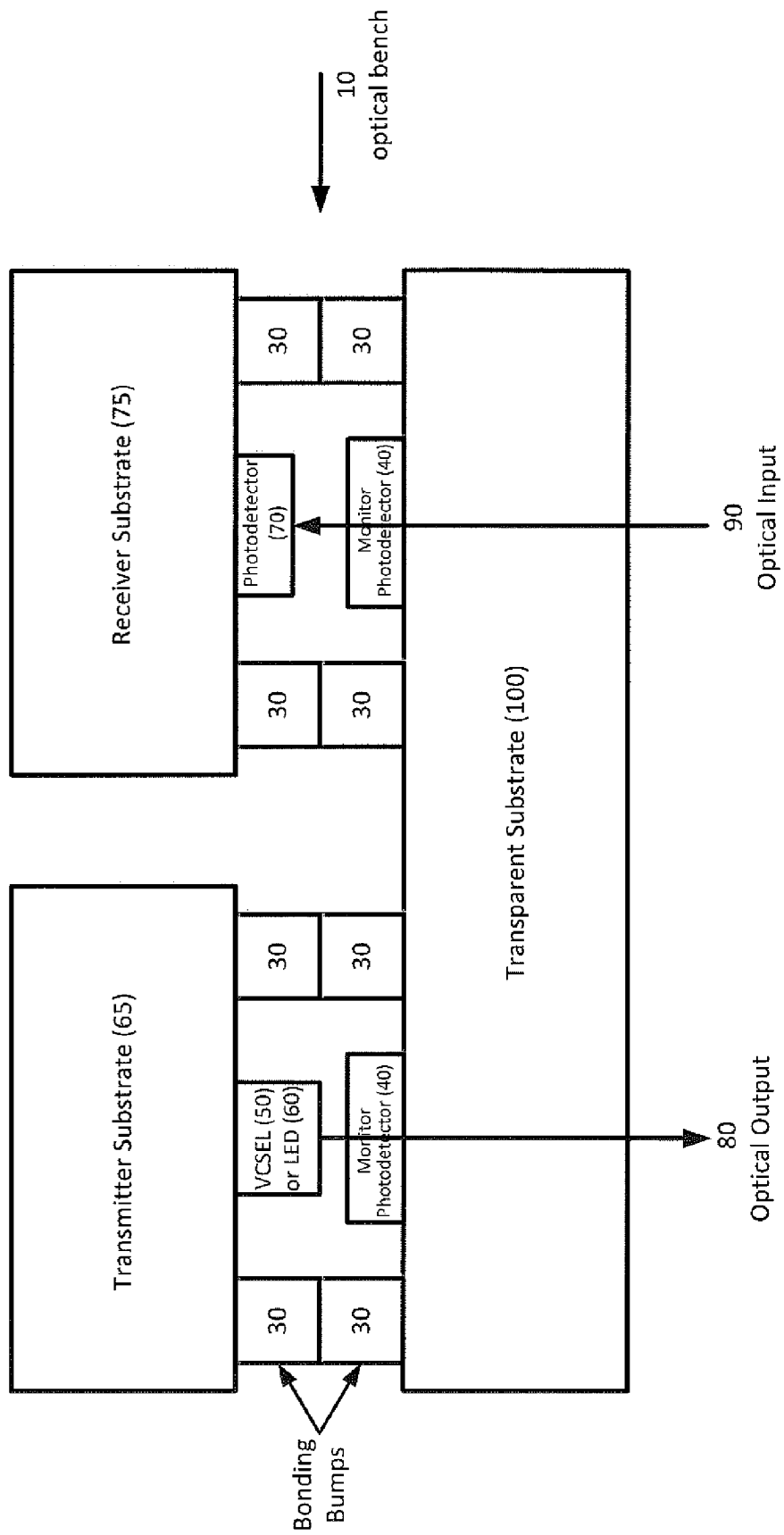
FIG. 2 is a schematic diagram of an embodiment of an optical bench with monitor photodetectors.
Figure 3:
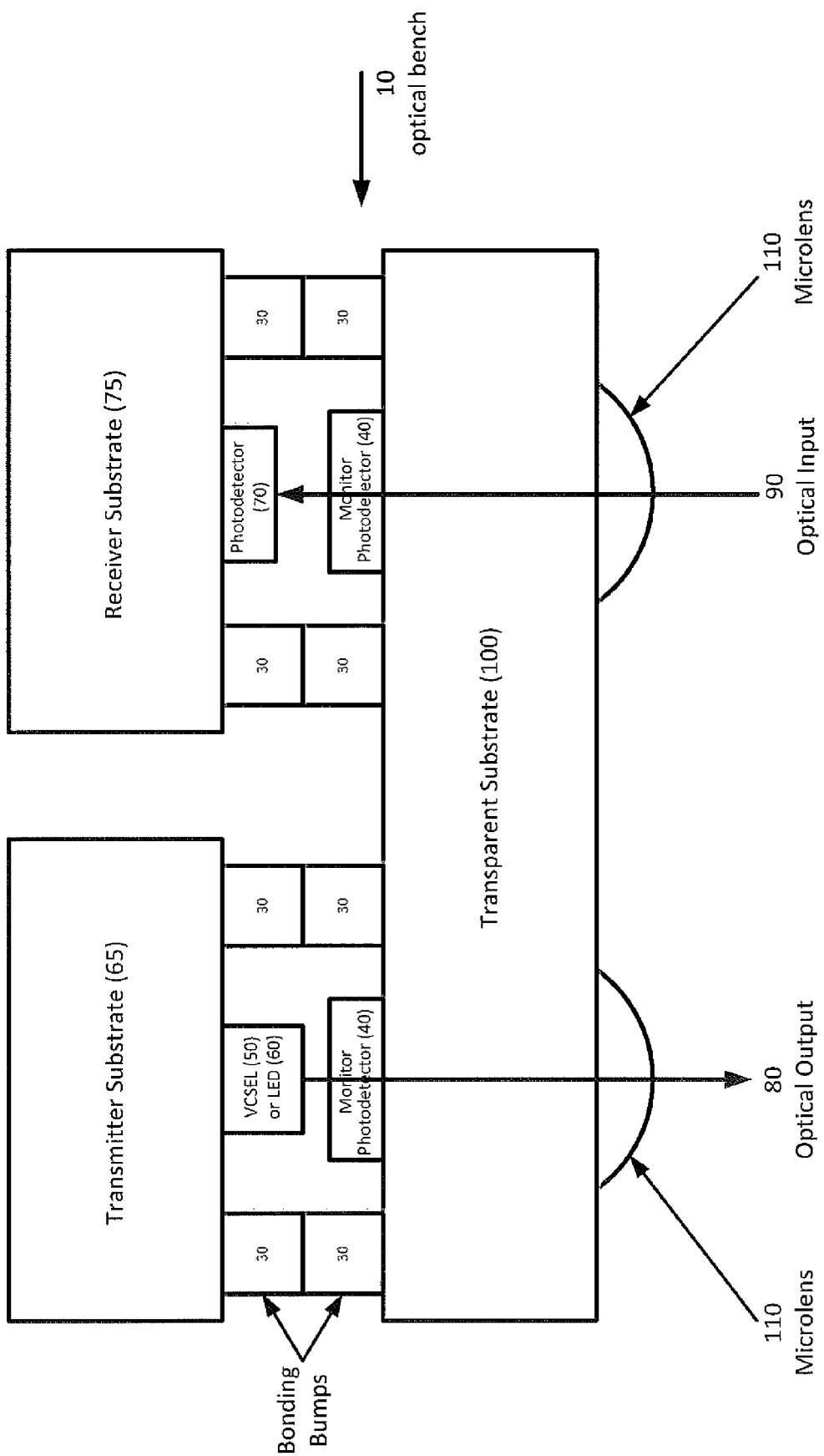
FIG. 3 is a schematic diagram of an embodiment of a populated optical bench with back-side microlenses for focusing and/or collimating output/input optical beams.

As shown in FIGS. 2 and 3, the transmitters may be VCSELs 50 and/or LEDs 60 and/or other suitable light transmission devices. For example, the transmitters may also be a Fabry-Perot laser having an angled mirror for vertical emission, a distributed feedback (DFB) laser having an angled mirror for vertical emission or a distributed feedback (DFB) laser having a diffraction grating for vertical emission. One having ordinary skill in the art may recognize that other types of light transmitters may be suitable for the present invention. Thus, this disclosure is not limited to a particular light transmitter and all suitable light transmitters are considered to be within the scope of this disclosure.

The receivers may be a variety of different types of photodetectors 70, for example, p-i-n photodetectors, single and/or multiple quantum well photodetectors, resonant cavity photodetectors, MSM photodetectors, avalanche photodetectors, phototransistors and/or photoconductors. The monitor photodetectors 40 may be single and/or multiple quantum well photodetectors, quantum dot photodetectors, and/or p-i-n photodetectors. The monitor photodetectors 40 and/or the photodetectors 70 may have absorbing regions consisting of a variety of materials including single crystal, polycrystalline, and/or amorphous semiconductors. The monitor photodetectors 40 may be biased or unbiased. One having ordinary skill in the art may recognize that other types of photodetectors may be suitable for the present invention. Thus, this disclosure is not limited to a particular photodetector and all suitable photodetectors are considered to be within the scope of this disclosure.

The transmitters, such as the VCSEL 50, and/or the receivers, such as the photodetector 70, for example a p-i-n photodetector, may be flip-chip bonded in any combination and/or number with the monitor photodetectors 40 included on at least one site, but not necessarily all of the sites. The light transmitters may also be integrated by die placement. Further, the optical power monitor photodetector 40 may be epitaxially grown or may be deposited by chemical vapor deposition.

FIG. 2 is a schematic of another embodiment of an optical bench populated with the VCSEL 50 and/or the photodetector 70. In particular, FIG. 2 illustrates the optical bench 10. Each bond site 30 may be populated with the VCSEL 50 and/or the LED 60 fabricated on a substrate 65 for the transmitter and/or the photodetector 70 fabricated on a substrate 75 for the receiver. As shown in FIG. 2, an outgoing optical beam, optical output 80 and/or an incoming optical beam, optical input 90, may pass through the respective monitor photodetector 40 and/or a substrate 100. The monitor photodetector 40 may absorb a small fraction of the transmitted optical power and may convert the small fraction of light into a monitor photocurrent. In an embodiment, the substrate 100 may be transparent. Further, the substrate 100 may have a surface having an anti-reflection coating (not shown).

FIG. 3 is a schematic of another embodiment of the optical bench 10 populated with the VCSEL 50 and/or the LED 60 and/or the photodetector 70. Each bond site 30 may be populated with the VCSEL 50 and/or the LED 60 for the transmitter and/or the photodetector 70 for the receiver. In the embodiment illustrated in FIG. 3, the optical bench 10 may also have microlenses 110 located on the substrate 100. As shown, the microlenses 110 may be arranged on a back side of the substrate 100 opposite to a front side of the substrate 100 having the monitor photodetectors 40. The microlenses 110 may also be aligned to front side devices such as, for example, optical fibers and/or other optical components (not shown) to form optical beams. For example, the microlenses 110 may form the optical beams of the optical output 80 and/or the optical beams of the optical input 90. The microlenses 110 may be either refractive and/or diffractive. For the transmitters, such as the VCSELs 50 and/or the LEDs 60, the microlenses 110 may focus and/or collimate the outgoing beam of the output beam 80 to simplify coupling of the light into optical fibers and/or other optical components (not shown). For the receivers, such as the photodetector 70, the microlenses 110 may focus the incoming beam of the optical input 90 onto the receiver 70. In an embodiment of the invention, the use of the microlenses 110 may enable a smaller and/or faster photodetector 70 to be used. Also, the use of the microlenses 110 in this manner may improve the alignment tolerances of the optical bench apparatus 10.

The optical bench apparatus 10 may be utilized to implement a method of monitoring optical power in an optical link. For example, the method may have the step of providing an optical bench apparatus 10 having the substrate 100 with the electrical interconnect lines 20. The method may have the step of integrating the optical power monitor photodetector 40 with the substrate 100. The electrical interconnect lines 20 may connect the optical power monitor photodetector 40. The method may also have the step of integrating the light transmitter, for example, the VCSEL 50 and/or the LED 60 with the substrate 100. The electrical interconnect lines 20 may connect the light transmitter. The light transmitter may have the optical output 80. Finally, the method may have the step of aligning the optical output 80 of the light transmitter relative to the optical power monitor photodetector 40 such that the optical output 80 of the light transmitter impinges on the optical power monitor photodetector 40.

The method may have additional steps to monitor optical power in an optical link. For example, the method may have the step of optimizing bias and modulation currents to achieve desired operating characteristics of the light transmitter. Further, the method may have the step of optimizing bias and modulation currents to achieve desired operating characteristics of the optical link. Also, the method may have the step of adjusting operating characteristics of the light transmitter for temperature variations by optimizing bias and/or modulation currents. Moreover, the method may have the step of adjusting operating characteristics of the transmitter for degradation by optimizing bias or modulation currents. In addition, the method may have the step of implementing health monitoring in a transceiver by monitoring transmitted power or received power in the optical link. Finally, the method may have the step of implementing built-in test functions in a transceiver by monitoring transmitted power or received power in the optical link.

In summary, the monitor photocurrent may be utilized for optimizing bias and/or modulation currents to achieve desired operating characteristics of the transmitter and/or an optical link. Such optimization of the bias and/or modulation currents may allow operating characteristics to be adjusted for temperature variations and/or degradation due to aging, optical alignment and/or other environmental factors. Monitoring the transmitted power and/or received power in an optical link may enable health monitoring and/or functions to be implemented in the transceiver. Further, monitoring the transmitted power and/or received power in an optical link may also enable built-in test functions to be implemented in the transceiver.

It should be understood that various changes and/or modifications to the presently preferred embodiments described herein will be apparent to those having ordinary skill in the art. Such changes and/or modifications may be made without departing from the spirit and/or scope of the present invention and without diminishing its attendant advantages. It is, therefore, intended that such changes and/or modifications be covered by the appended claims.

I claim:

1. An optical bench apparatus comprising:
    a substrate having a first side and a second side, wherein the second side is located opposite the first side;
    an optical power monitor photodetector on the first side of the substrate;
    a light transmitter configured to emit an optical output;
    first group of electrical interconnect lines located on the substrate, wherein the first electrical interconnect lines are configured to connect to the light transmitter;
    second group of electrical interconnect lines located on the substrate and configured to connect to the optical power monitor photodetector; and
    a bonding site on the substrate configured to bond to the light transmitter, wherein the bonding site is located to optically align the light transmitter with the optical power monitor photodetector such that the optical output of the light transmitter impinges on the optical power monitor photodetector,
    wherein the optical power monitor photodetector is configured to receive the optical output emitted by the light transmitter and absorb a portion of the received optical output so that less than all of the optical output emitted by the light transmitter passes through the substrate.

2. The apparatus of claim 1, wherein the optical power monitor photodetector is configured to transmit the optical output of the light transmitter.

3. The apparatus of claim 1, wherein the optical power monitor photodetector is configured to absorb a first portion of the optical output of the light transmitter, and wherein the substrate is configured to transmit a second portion of the optical output of the light transmitter.

4. The apparatus of claim 1, further comprising:
    a lens on the second side of the substrate opposite the light transmitter, wherein the lens is configured to collimate, focus, or steer the optical output of the light transmitter.

5. The apparatus of claim 1, wherein the substrate has a surface having an anti-reflection coating.

6. The apparatus of claim 1, wherein the first and second groups of electrical interconnect lines are impedance matched.

7. The apparatus of claim 1, wherein the substrate includes a semiconductor, Gallium Arsenide (GaAs), semi-insulating Gallium Arsenide, Aluminum Gallium Arsenide (AlGaAs), Indium Phosphide (InP), silicon, an insulator, sapphire or quartz glass.

8. The apparatus of claim 1, wherein the light transmitter includes a light emitting diode (LED), a vertical-cavity surface-emitting laser (VCSEL), a Fabry-Perot laser having an angled mirror for vertical emission, a distributed feedback (DFB) laser having an angled mirror for vertical emission, or a distributed feedback (DFB) laser having a diffraction grating for vertical emission.

9. The apparatus of claim 1, wherein the optical power monitor photodetector includes a single crystal semiconductor, a polycrystalline material, an amorphous material, silicon, germanium, Indium Gallium Arsenide (InGaAs), a p-i-n photodetector, or a metal-semiconductor-metal (MSM) photodetector.

10. The apparatus of claim 1, wherein the optical power monitor photodetector has an absorbing region, wherein the absorbing region includes a bulk material, quantum well, or quantum dots.

11. The apparatus of claim 1, wherein the bonding site configured to bond to the light transmitter includes a flip-chip bond or by die placement.

12. An optical bench apparatus comprising:
    a light transmitter configured to emit an optical signal;
    a substrate configured to transmit at least part of the optical signal emitted by the light transmitter;
    an optical power monitor photodetector disposed on the substrate, wherein the optical power monitor photodetector is configured to receive the optical signal emitted by the light transmitter and absorb a portion of the received optical signal so that less than all of the optical signal emitted by the light transmitter passes through the substrate; and
    a receiver substrate including a photodetector electrically connected to the substrate to align the photodetector with the optical power monitor photodetector so that the photodetector and the optical power monitor detect the optical input transmitted through the substrate.

13. The apparatus of claim 12, wherein the photodetector is configured to receive the optical input through the optical power monitor photodetector.

14. The apparatus of claim 12, wherein the optical power monitor photodetector is configured to absorb a portion of the optical input.

15. The apparatus of claim 12, wherein the optical power monitor photodetector is configured to absorb a first part of the optical input, and wherein the photodetector is configured to receive a second part of the optical input through the substrate.

16. The apparatus of claim 12, further comprising:
    a lens disposed on the substrate to collimate, focus or steer the optical input to the photodetector.

17. The apparatus of claim 16, wherein the lens includes a refractive lens, or a diffractive lens.

18. The apparatus of claim 12, comprising:
    an anti-reflection coating on a surface of the substrate.

19. The optical bench apparatus of claim 12, comprising:
    a first group of electrical interconnect lines located on the substrate to connect to the photodetector; and
    a second group of electrical interconnect lines located on the substrate to connect to the optical power monitor photodetector.

20. The apparatus of claim 12, wherein the substrate includes a semiconductor, Gallium Arsenide (GaAs), semi-insulating Gallium Arsenide, Aluminum Gallium Arsenide (AlGaAs), Indium Phosphide (InP), silicon, an insulator, sapphire, or quartz glass.

21. The apparatus of claim 12, wherein the photodetector includes a p-i-n photodetector, a resonant cavity photodetector, an avalanche photodetector, or a metal-semiconductor-metal (MSM) photodetector.

22. The apparatus of claim 12, wherein the receiver substrate that includes the photodetector is connected to the substrate by flip-chip bonding or by die placement.

23. A method of monitoring optical power in an optical link comprising:
- emitting, from a light transmitter integrated with an optical bench apparatus having a substrate, an optical output; and
- detecting, by an optical power monitor photodetector aligned with the light transmitter, the optical output of the light transmitter that impinges on the optical power monitor photodetector;
- absorbing, by the optical power monitor photodetector, a fraction of the detected optical output so that less than all of the optical output emitted by the light transmitter passes through the substrate;
- converting, by the optical power monitor photodetector, the absorbed fraction of the detected optical output into a monitor photocurrent; and
- monitoring the optical power of the emitted optical output based on the monitor photocurrent.

24. The method of claim 23, further comprising:
- adjusting bias and modulation currents to achieve desired operating characteristics of the light transmitter.

25. The method of claim 23, further comprising:
- adjusting bias and modulation currents to achieve desired operating characteristics of the optical link.

26. The method of claim 23, further comprising:
- adjusting operating characteristics of the light transmitter for temperature variations by adjusting bias or modulation currents.

27. The method of claim 23, further comprising:
- adjusting operating characteristics of the transmitter for degradation by adjusting bias or modulation currents.

28. The method of claim 23, further comprising:
- implementing health monitoring in a transceiver by monitoring transmitted power or received power in the optical link.

29. The method of claim 23, further comprising:
- implementing built-in test functions in a transceiver by monitoring transmitted power or received power in the optical link.

30. A method of manufacturing an optical bench apparatus, comprising:
- providing an optical bench apparatus having a substrate and an integrated optical power monitor photodetector;
- providing electrical interconnect lines on the substrate;
- integrating a photodetector with some of the electrical interconnect lines to the optical bench apparatus;
- connecting the optical power monitor photodetector with some other of the electrical interconnect lines to the optical bench apparatus; and
- aligning the photodetector with the optical power monitor photodetector such that an optical input is transmitted through the optical power-monitor photodetector and the photodetector,
- wherein the optical power monitor photodetector is integrated with the substrate to absorb a portion of the optical input so that less than all of the optical input passes through the substrate.

31. The optical bench apparatus of claim 1, wherein the optical power monitor photodetector and the light transmitter are integrated on the substrate.

32. The optical bench apparatus of claim 12, wherein the optical power monitor photodetector is integrated on the substrate.

33. The apparatus of claim 19, wherein the first and second groups of electrical interconnect lines are impedance matched.

34. The optical bench apparatus of claim 12, comprising:
- another optical power monitor photodetector disposed on the substrate;
- a transmitter substrate including an optical transmitter electrically connected to the substrate to align the optical transmitter with the other optical power monitor photodetector so that an optical output emitted by the optical transmitter is transmitted through the optical power monitor and the substrate.

35. The method of claim 30, comprising:
- epitaxially growing the optical power monitor photodetector.

36. The method of claim 30, comprising:
- depositing the optical power monitor photodetector by chemical vapor deposition.

37. The method of claim 30, comprising:
- integrating a light transmitter configured to emit an optical output with the substrate; and
- integrating another optical power monitor photodetector in alignment with the light transmitter to detect the optical output emitted by the light transmitter.

* * * * *